(12) United States Patent
Cheng

(10) Patent No.: US 9,331,578 B2
(45) Date of Patent: May 3, 2016

(54) MULTI-PHASE BUCK DC CONVERTER

(71) Applicant: ASUSTeK COMPUTER INC., Taipei (TW)

(72) Inventor: Hao-Chien Cheng, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 110 days.

(21) Appl. No.: 14/324,088

(22) Filed: Jul. 4, 2014

(65) Prior Publication Data

US 2015/0015225 A1 Jan. 15, 2015

(30) Foreign Application Priority Data

Jul. 12, 2013 (CN) .......................... 2013 1 0293636

(51) Int. Cl.
H02M 3/158 (2006.01)

(52) U.S. Cl.
CPC .... H02M 3/1584 (2013.01); *H02M 2003/1586* (2013.01)

(58) Field of Classification Search
CPC . H02M 3/158; H02M 3/1584; H02M 3/1588; H02M 2003/1586
USPC ........ 363/59, 60, 61, 69, 70, 71, 72; 323/217, 323/223, 225, 272; 327/436
See application file for complete search history.

(56) References Cited

U.S. PATENT DOCUMENTS

| | | | |
|---|---|---|---|
| 5,932,995 A * | 8/1999 | Wagoner | H02M 3/158 323/222 |
| 7,948,221 B2 | 5/2011 | Watanabe et al. | |
| 2002/0118000 A1 * | 8/2002 | Xu | H02M 3/158 323/259 |
| 2006/0284490 A1 | 12/2006 | Kumar | |
| 2008/0278979 A1 | 11/2008 | Ortiz-Lopez et al. | |

(Continued)

FOREIGN PATENT DOCUMENTS

| | | |
|---|---|---|
| CN | 1052828 C | 5/2000 |
| EP | 0428377 A2 | 5/1991 |
| TW | 201101659 A | 1/2011 |

OTHER PUBLICATIONS

Ching-Tsai Pan; Chen-Feng Chuang; Chia-Chi Chu, "A transformerless interleaved four-phase current-fed converter with new voltage multiplier topology," in Future Energy Electronics Conference (IFEEC), 2013 1st International , vol., no., pp. 187-193, Nov. 3-6, 2013.*

(Continued)

*Primary Examiner* — Gary L Laxton
*Assistant Examiner* — Jye-June Lee
(74) *Attorney, Agent, or Firm* — CKC & Partners Co., Ltd.

(57) ABSTRACT

A multi-phase buck DC converter comprise a plurality of storage inductors, a plurality of low-side switches, a first input capacitor, a second input capacitor, a plurality of high-side switches and at least one clamping capacitor. The storage inductors are used to drive a load. The low-side switches are connected to the storage inductors; respectively. The second input capacitor is connected to the first input capacitor in series. The contact of the first input capacitor and the second input capacitor is connected to one storage inductor. A part of the high-side switches are connected in series. One end of each clamping capacitor is connected to any two high-side switches connected in series and the other end is connected to the storage inductors.

12 Claims, 16 Drawing Sheets

(56) References Cited

U.S. PATENT DOCUMENTS

2009/0231887 A1* 9/2009 Ye ............... H02M 3/33569 363/21.02
2015/0097546 A1* 4/2015 Pan ............... H02M 3/158 323/311

OTHER PUBLICATIONS

Ching-Tasi Pan; Chen-Feng Chuang; Chia-Chi Chu; Hao-Chien Cheng, "A novel transformer-less interleaved four-phase high step-down Dc converter with low switch voltage stress," in Power Electronics Conference (IPEC—Hiroshima 2014—ECCE—ASIA), 2014 International , vol., no., pp. 3379-3385, May 18-21, 2014.*

Ching-Tsai Pan; Chen-Feng Chuang; Chia-Chi Chu, "A Novel Transformerless Interleaved High Step-Down Conversion Ratio DC-DC Converter With Low Switch Voltage Stress," in Industrial Electronics, IEEE Transactions on , vol. 61, No. 10, pp. 5290-5299, Oct. 2014.*

Peng Xu; Jia Wei; Lee, F.C., "Multiphase coupled-buck converter-a novel high efficient 12 V voltage regulator module," in Power Electronics, IEEE Transactions on , vol. 18, No. 1, pp. 74-82, Jan. 2003.*

Oraw, B.; Ayyanar, R., "Small Signal Modeling and Control Design for New Extended Duty Ratio, Interleaved Multiphase Synchronous Buck Converter," in Telecommunications Energy Conference, 2006. INTELEC '06. 28th Annual International , vol., no., pp. 1-8, Sep. 2006.*

Il-Oun Lee; Shin-Young Cho; Gun-Woo Moon, "Interleaved buck converter having low switching losses and improved step-down conversion ratio," in Power Electronics and ECCE Asia (ICPE & ECCE), 2011 IEEE 8th International Conference on , vol., no., pp. 2136-2143, May 30, 2011-Jun. 3, 2011.*

* cited by examiner

MULTI-PHASE BUCK DC CONVERTER

CROSS-REFERENCE TO RELATED APPLICATION

This application claims the priority benefit of China application serial No. 201310293636.5, filed on Jul. 12, 2013. The entirety of the above-mentioned patent application is hereby incorporated by reference herein and made a part of specification.

BACKGROUND OF THE INVENTION

1. Field of the Invention

The disclosure relates to a converter and, more particularly, to a buck DC converter.

2. Description of the Related Art

In recent years, interleaved buck DC converters are developed to meet the requirement of low output current ripple. The interleaved buck DC converter includes several conventional buck DC converters which are connected in parallel and output to a plurality of inductors with different phases. The conductive loss is reduced by a plurality of inductors for shunting current. Additionally, the output ripple current is lowered via the interleaved switching.

If the interleaved buck DC converter is applied in the high step-down ratio, the main disadvantage is that the active switch needs to withstand the high voltage of the input end when the active switch is turned off, and thus high voltage-resisting switch components should be chosen. In addition, since the step-down ratio of the interleaved buck DC converter buck is not high enough, the duty cycle of the active switch needs to operate at the critical situation of 0%. Consequentially, the additional switching loss of the active switch in the interleaved buck DC converter is generated, and the current conductive loss at the low-side switch is increased.

In addition, in order to reduce the conductive loss of each inductor, the interleaved buck DC converter should make the inductive current on each phase current average. Thus, a current control circuit should be added to each phase circuit, which makes the circuit complex and increase the cost of the components.

BRIEF SUMMARY OF THE INVENTION

An N-phase buck DC converter for driving loads is provided where the N=2n and N is an even number greater than 4. The N-phase buck DC converter comprise N storage inductors, N low-side switches, a first input capacitor, a second input capacitor, N high-side switches and N−2 clamping capacitors. The N storage inductors are connected to the loads and are divided into a first part storage inductor and a second part storage inductor. The first part storage inductor includes the first storage inductor to the $(2n-1)^{th}$ storage inductor with an odd numbers of intervals, the second part storage inductor includes the second storage inductor to the $2n^{th}$ storage inductor with the an even numbers of intervals. One side of each low-side switch is connected to the N storage inductors, respectively. The second input capacitor is connected to the first input capacitor in series. The contact of the first input capacitor and the second input capacitor is connected to the second storage inductor of the N storage inductors. The N high-side switches are divided into a first part high-side switch and a second part high-side switch, the first part high-side switch includes the first high-side switch to the $(2n-1)^{th}$ high-side switch with an odd numbers of intervals, the second part high-side switch includes the second high-side switch to the $2n^{th}$ high-side switch with an even numbers of intervals. The $(2n-1)^{th}$ high-side switch of the first part high-side switch is connected to the $(2n-1)^{th}$ the storage inductor of the N storage inductors. N−2 clamping capacitors are divided in to a first part clamping capacitor and a second part clamping capacitor, the first part clamping capacitor include a first clamping capacitor to a $(2n-3)^{th}$ clamping capacitor with an odd numbers of intervals. One side of a $k^{th}$ clamping capacitor is connected to the $k^{th}$ high-side switch and the $(k+2)^{th}$ high-side switch and the other side of the $k^{th}$ clamping capacitor is connected to the $k^{th}$ storage inductor of the N storage inductors, wherein k is an odd number between 1 and (2n−3). The second part clamping capacitor includes a second clamping capacitor to a $(2n-2)^{th}$ clamping capacitor with an even numbers of intervals. One side of a $j^{th}$ clamping capacitor is connected to the $j^{th}$ high-side switch and the $(j+2)^{th}$ high-side switch and the other side of the $j^{th}$ clamping capacitor is connected to the $(j+2)^{th}$ storage inductor of the N storage inductors, wherein j is an even number between 2 and (2n−2).

Another N-phase buck DC converter is provided and the N=2n+1 and N is an odd number greater than 3. The N-phase buck DC converter comprise N storage inductors, N low-side switches, a first input capacitor, a second input capacitor, N high-side switches and N−2 clamping capacitors. The N storage inductors are connected to the loads and are divided into a first part and a second part. The first part includes the first storage inductor to the $(2n+1)^{th}$ storage inductor with an odd numbers of intervals, the second part includes the second storage inductor to the $2n^{th}$ storage inductor with the an even numbers of intervals. One side of each low-side switch is connected to the N storage inductors, respectively. The second input capacitor is connected to the first input capacitor in series. The contact of the first input capacitor and the second input capacitor is connected to the second storage inductor of the N storage inductors. The N high-side switches are divided into a first part and a second part. The first part includes the first high-side switch to the $(2n+1)^{th}$ high-side switch with an odd numbers of intervals, the second part includes the second high-side switch to the $2n^{th}$ high-side switch with an even numbers of intervals. The $(2n-1)^{th}$ high-side switch of the first part is connected to the $(2n+1)^{th}$ the storage inductor of the N storage inductors. N−2 clamping capacitors are divided in to a first part and a second part, the first part clamping capacitor include a first clamping capacitor to a $(2n-1)^{th}$ clamping capacitor with an odd numbers of intervals. One side of a $k^{th}$ clamping capacitor is connected to the $k^{th}$ high-side switch and the $(k+2)^{th}$ high-side switch and the other side of the $k^{th}$ clamping capacitor is connected to the $k^{th}$ storage inductor of the N storage inductors, wherein k is an odd number between 1 and (2n−1). When N>3, the second part clamping capacitor includes a second clamping capacitor to a $(2n-2)^{th}$ clamping capacitor with an even numbers of intervals. One side of a jth clamping capacitor is connected to the jth high-side switch and the $(j+2)^{th}$ high-side switch and the other side of the jth clamping capacitor is connected to the $(j+2)^{th}$ storage inductor of the N storage inductors, wherein j is an even number between 2 and (2n−2).

DETAILED DESCRIPTION OF THE EMBODIMENTS

A multi-phase buck DC converter is provided. A plurality of input capacitors and clamping capacitors are separately set at a plurality of converter circuits with different phases, so as to replace a conventional single input capacitor component with high capacitance. Thus, the cost of the capacitors is reduced, the step-down ratio can be increased via split-phases, and the voltage across the high side and the low side is decreased. The detail descriptions of the above disadvantages would be illustrated in the following embodiments.

The multi-phase buck DC converter with different phases can be chosen according to the specification (the value of the voltage or the current needed to be converted) and the cost. The multi-phase buck DC converters with different phases are illustrated in the following embodiments.

Figure 1:
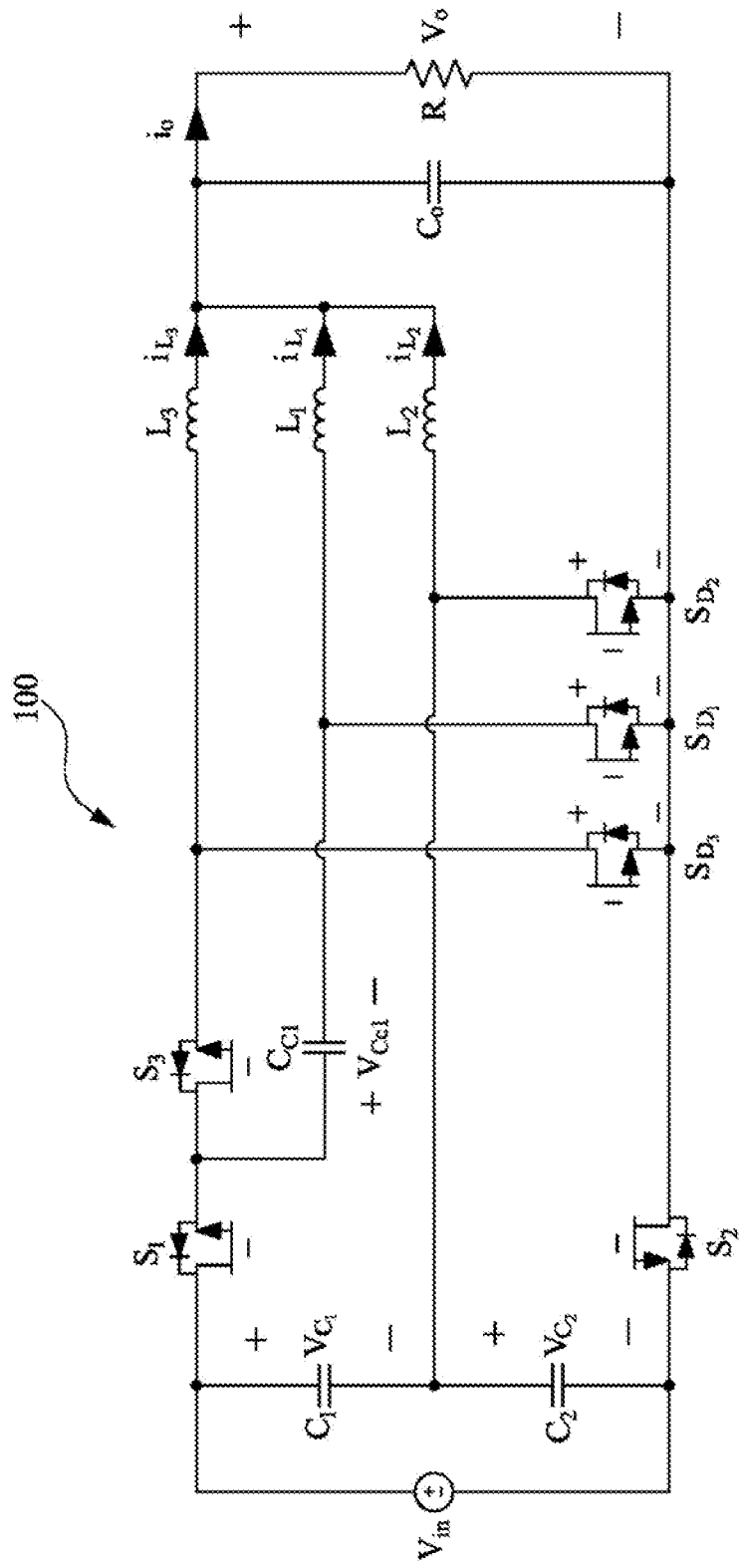
FIG. 1 is a schematic diagram showing a three-phase buck DC converter in an embodiment.

FIG. 1 is a schematic diagram showing a three-phase buck DC converter 100 in an embodiment. The three-phase buck DC converter 100 includes a first input capacitor $C_1$, a second input capacitor $C_2$, a first clamping capacitor $C_{C1}$, a first high-side switch $S_1$, a second high-side switch $S_2$, a third high-side switch $S_3$, a first low-side switch $S_{D1}$, a second low-side switch $S_{D2}$, a third low-side switch $S_{D3}$, a first storage inductor $L_1$, a second storage inductor $L_2$, a third storage inductor $L_3$ and an output capacitor $C_O$.

The first input capacitor $C_1$ and the second input capacitor $C_2$ in the three-phase buck DC converter 100 are connected in series to receive the input voltage $V_{in}$, so as to stabilize the voltage and decrease the cut-off voltage stress of the switching component in the three-phase buck DC converter 100. The contact of the first input capacitor $C_1$ and the second input capacitor $C_2$ is connected to the second storage inductors $L_2$. The input voltage $V_{in}$ of the three-phase buck DC converter 100 is approximately equally distributed on the first input capacitor $C_1$ and the second input capacitor $C_2$. The first high-side switch $S_1$, the second high-side switch $S_2$ and the third high-side switch $S_3$ can be divided into a first pan (the first high-side switch $S_1$ and the third high-side switch $S_3$) and a second part (the second high-side switch $S_2$). In the first part, the first high-side switch $S_1$ and the third high-side switch $S_3$ are connected in series, the first high-side switch $S_1$ at the front end is connected to the first input capacitor $C_1$, the third high-side switch $S_3$ at the back end is connected to the third storage inductor $L_3$, the contact of the first high-side switch $S_1$ and the third high-side switch $S_3$ is connected to the first storage inductors $L_1$ via a first clamping capacitor $C_{C1}$.

On the other side, one end of the second high-side switch $S_2$ in the second part is connected to the second input capacitor $C_2$, and the other end is connected to the first low-side switch $S_{D1}$, the second low-side switch $S_{D2}$ and the third low-side switch $S_{D3}$. The first low-side switch $S_{D1}$, the second low-side switch $S_{D2}$ and the third low-side switch $S_{D3}$ are correspondingly connected to the first storage inductor $L_1$, the second storage inductor $L_2$ and the third storage inductor $L_3$, respectively. One end of the output capacitor $C_O$ is connected to the first low-side switch $S_{D1}$, the second low-side switch $S_{D2}$ and the third low-side switch $S_{D3}$, and the other side is connected to the first storage inductor $L_1$, the second storage inductor $L_2$ and the third storage inductor $L_3$. In addition, the resistor R is connected to the output capacitor $C_O$ in parallel.

Figure 2:
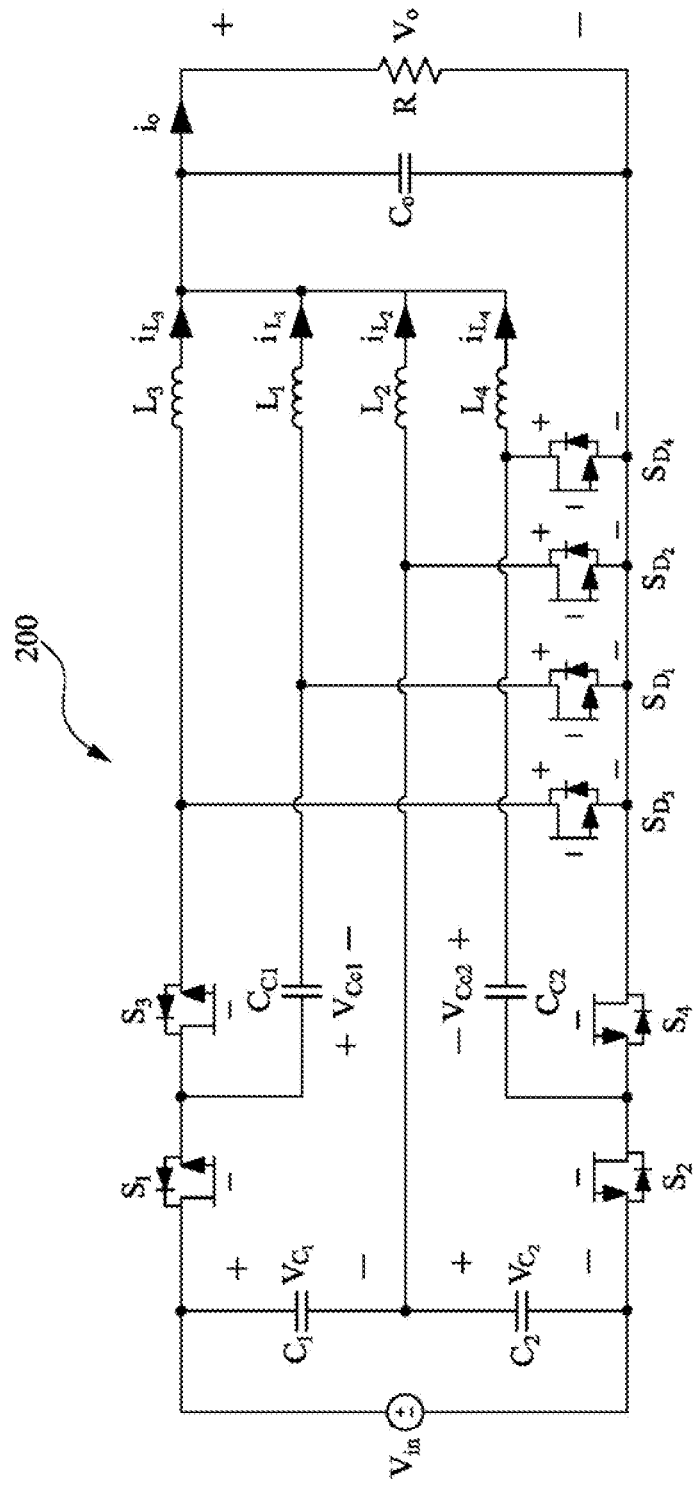
FIG. 2 is a schematic diagram showing a four-phase buck DC converter in an embodiment.

In the above embodiment, the three-phase buck DC converter 100 is provided, but the buck DC converter is not limited to three phases, the setting manner of the four phases and N phases buck DC converters are provided in the following embodiments, wherein N is any positive integer more than 3. FIG. 2 is a schematic diagram showing a four-phase buck DC converter in an embodiment.

In FIG. 2, the four-phase buck DC converter 200 includes a first input capacitor $C_1$, a second input capacitor $C_2$, a first clamping capacitor $C_{C1}$ and a second clamping capacitor $C_{C2}$, a first high-side switch $S_1$, a second high-side switch $S_2$, a third high-side switch $S_3$, a fourth high-side switch $S_4$, a first low-side switch $S_{D1}$, a second low-side switch $S_{D2}$, a third low-side switch $S_{D3}$, a fourth low-side switch $S_{D4}$, a first storage inductor $L_1$, a second storage inductor $L_2$, a third storage inductor $L_3$, a fourth storage inductor $L_4$ and an output capacitor $C_O$. The high-side switches are divided into a first part (the first high-side switch St and the third high-side switch $S_3$) and a second part (the second high-side switch $S_2$ and the fourth high-side switch $S_4$).

In the four-phase buck DC converter 200, the first input capacitor $C_1$ and the second input capacitor $C_2$ are connected in series, and the contact of the two input capacitors is connected to the second storage inductor $L_2$.

In the first part of the high-side switches, the first high-side switch $S_1$ and the third high-side switch $S_3$ are connected in series, the first high-side switch $S_1$ is connected to the first input capacitor $C_1$, the third high-side switch $S_3$ is connected to the third storage inductor $L_3$, the contact of the first high-side switch $S_1$ and the third high-side switch $S_3$ is connected to the first storage inductor $L_1$ via the first clamping capacitor $C_{C1}$.

On the other side, in the second part of the high-side switches, the second high-side switch $S_2$ and the fourth high-side switch $S_4$ are connected in series, the second high-side switch $S_2$ is connected to the second input capacitor $C_2$. One end of the fourth high-side switch $S_4$ is connected to a resistor R and the other end of the output capacitor $C_O$ (that is a negative end of the output signal). The contact of the fourth high-side switch $S_4$ and the second high-side switch $S_2$ is connected to the corresponding fourth storage inductor $L_4$ via the second clamping capacitor $C_{C2}$.

One side of each low-side switch $S_{D1}$, $S_{D2}$, $S_{D3}$ and $S_{D4}$ is connected to the corresponding storage inductor $L_1$, $L_2$, $L_3$ and $L_4$, respectively. The other side of each low-side switch $S_{D1}$, $S_{D2}$, $S_{D3}$, and $S_{D4}$ is connected to one side of the fourth high-side switch $S_4$. The two sides of the output capacitor $C_O$ are respectively connected to the low-side switches $S_{D1}$, $S_{D2}$, $S_{D3}$ and $S_{D4}$ and the storage inductors $L_1$, $L_2$, $L_3$ and $L_4$. In addition, the resistor R and the output capacitor $C_O$ are connected in parallel.

Figure 3:
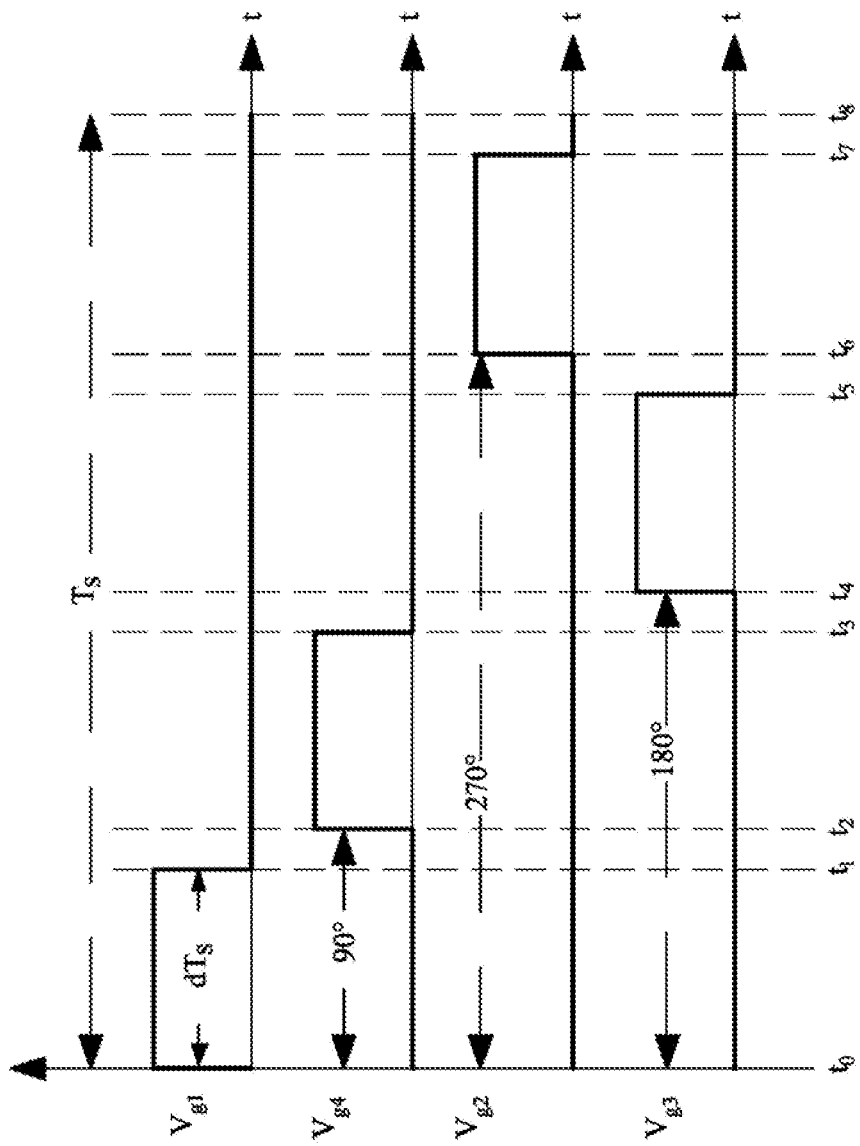
FIG. 3 is a sequence diagram of switching signals of the four-phase buck DC converter shown in FIG. 2.

In order to explain the circuit of the disclosure more clearly, the four-phase buck DC converter 200 in FIG. 2 is taken as an example to explain the operation mode. Please refer to FIG. 3. FIG. 3 is a sequence diagram of switching signals of the four-phase buck DC converter shown in FIG. 2.

Figure 4:
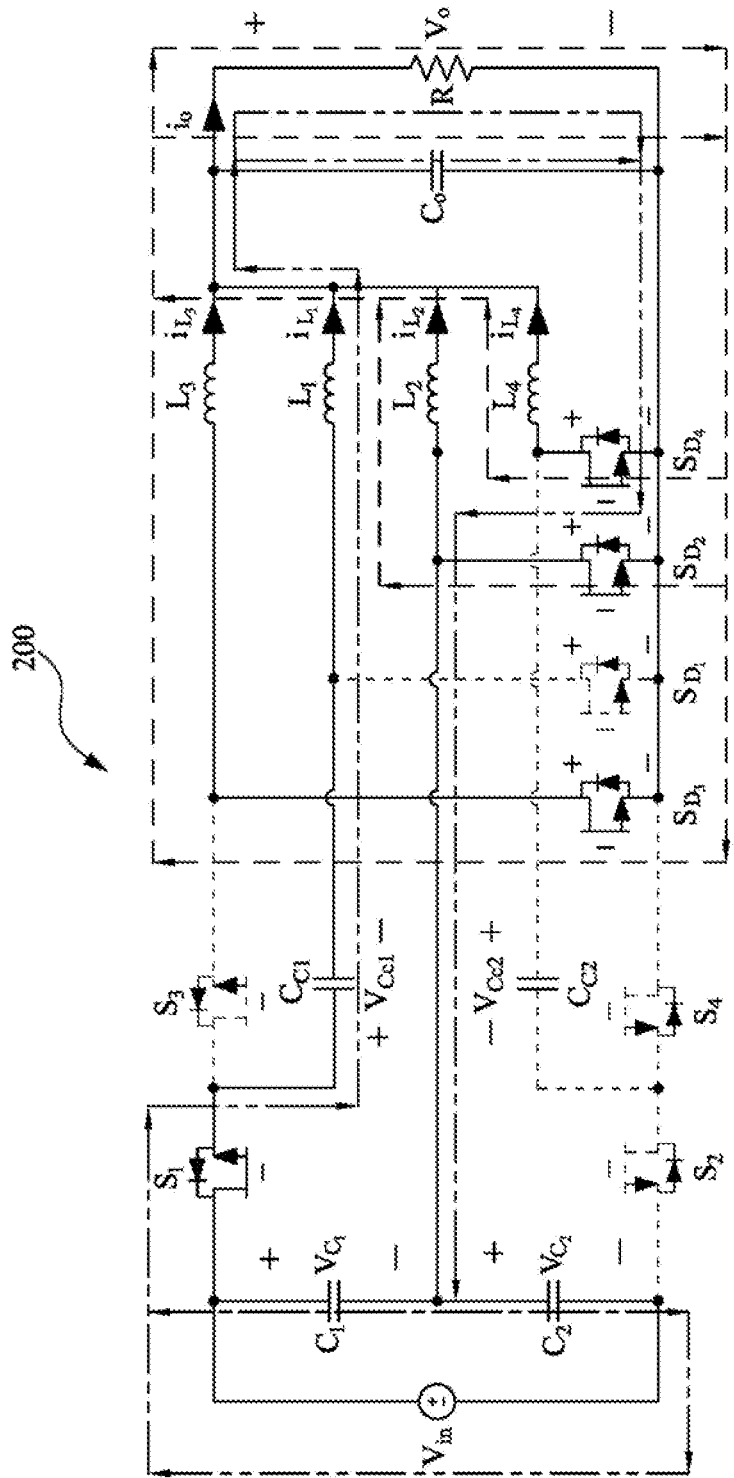
FIG. 4 is a schematic diagram showing the equivalent circuit of the four-phase buck DC converter in a period of $t_0 \leq t \leq t_1$.

Please refer to FIG. 4; FIG. 4 is a schematic diagram showing the equivalent circuit of the four-phase buck DC converter in a period of $t_0 \le t \le t_1$. In the embodiment in FIG. 3 and FIG. 4, the loop operation of the four-phase buck DC converter 200 has been stabilized, it is not the initial startup state, and the time point $t_0$ does not represent the timing of the initial startup.

As shown in FIG. 3 and FIG. 4, the first high-side switch $S_1$ is turned on, the other high-side switches $S_2$, $S_3$ and $S_4$ are turned off (the relating circuit of the turned off high-side switches $S_2$, $S_3$ and $S_4$ in FIG. 4 are represented by dotted lines), the first input capacitor $C_1$ discharges power to the first storage inductor $L_1$ and the first clamping capacitor $C_{C1}$ to drive the load via the storage inductors $L_1$.

In the period of $t_0 \le t \le t_1$, the voltage across the second clamping capacitor $C_{C2}$ is clamped to a fixed voltage, and the first input capacitor $C_1$ drives the load through the first storage inductor $L_1$. The energy storage of the second storage inductor $L_2$, the third storage inductor $L_3$, the fourth storage inductor $L_4$ is finished in the previous loop operation, and the second output capacitor $C_2$, the third output capacitor $C_3$ and the fourth output capacitor $C_4$ drive the load through the second storage inductor $L_2$, the third storage inductor L3 and the fourth storage inductor $L_4$.

Figure 5:
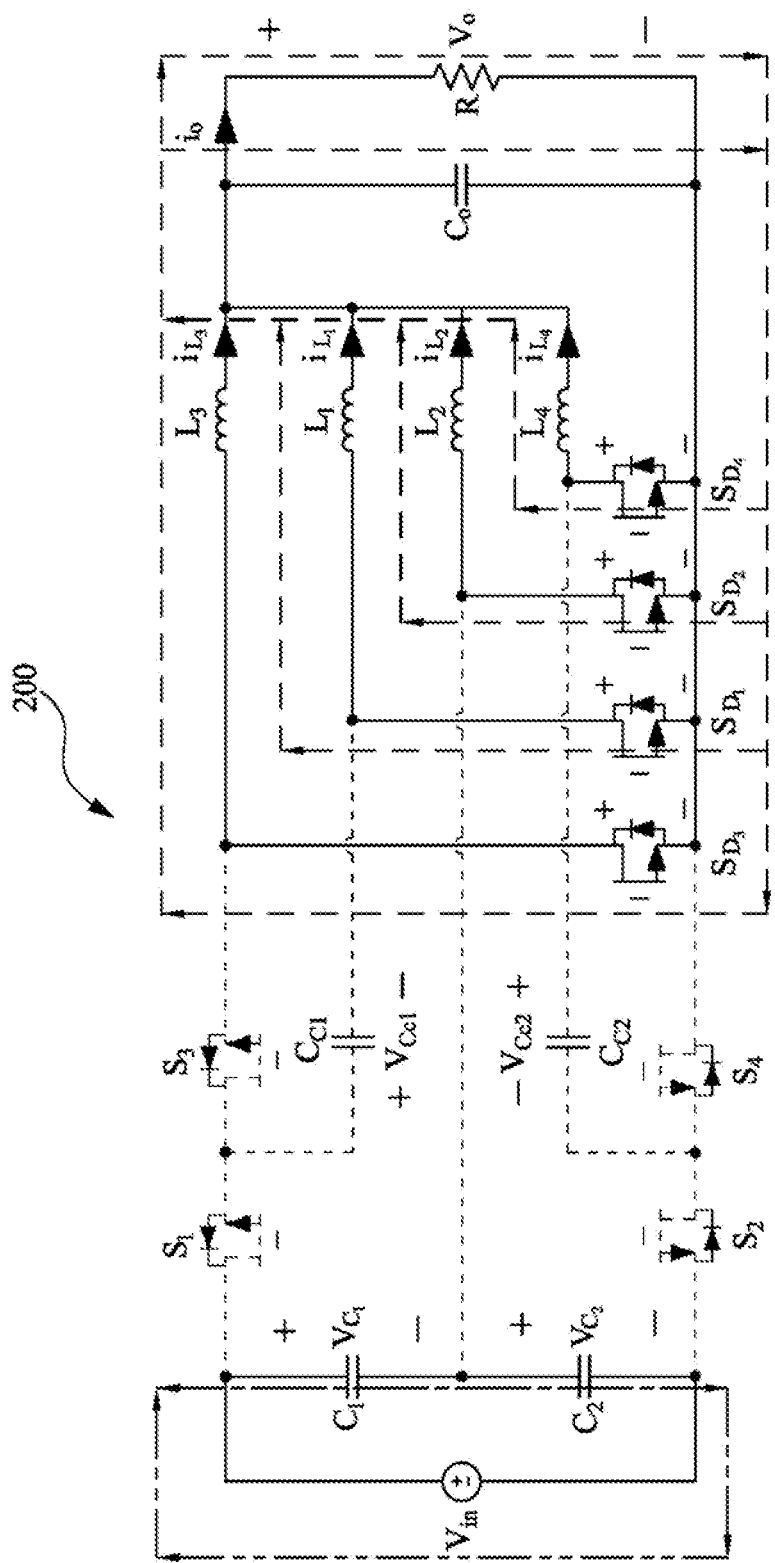
FIG. 5 is a schematic diagram showing the equivalent circuit of the four-phase buck DCX converter in periods of $t_1 \leq t \leq t_2$, $t_3 \leq t \leq t_4$, $t_5 \leq t \leq t_6$ and $t_7 \leq t \leq t_8$.

Please refer to FIG. 5. FIG. 5 is a schematic diagram showing the equivalent circuit of the four-phase buck DC converter 200 in the period of $t_1 \le t \le t_2$, $t_3 \le t \le t_4$, $t_5 \le t \le t_6$ and $t_7 \le t \le t_8$. That is, FIG. 5 is the equivalent circuit of the four-phase buck DC converter 200 in the period of $t_{k-1} \le t \le t_k$, wherein k∈{2, 4, 6, 8}.

As shown in FIG. 3 and FIG. 5, the high-side switches $S_1$, $S_2$, $S_3$ and $S_4$ are turned off in the four modes (the relating circuit of high-side switches $S_1$, $S_2$, $S_3$ and $S_4$ in FIG. 5 which are turned off are represented by dotted lines). In the period of $t_1 \le t \le t_2$, $t_3 \le t \le t_4$, $t_5 \le t \le t_6$ and $t_7 \le t \le t_8$, the second clamping capacitor $C_{C2}$ and the first clamping capacitor $C_{C1}$ are clamped to a fixed voltage respectively and drive the load through the storage inductors $L_1$, $L_2$, $L_3$ and $L_4$.

Figure 6:
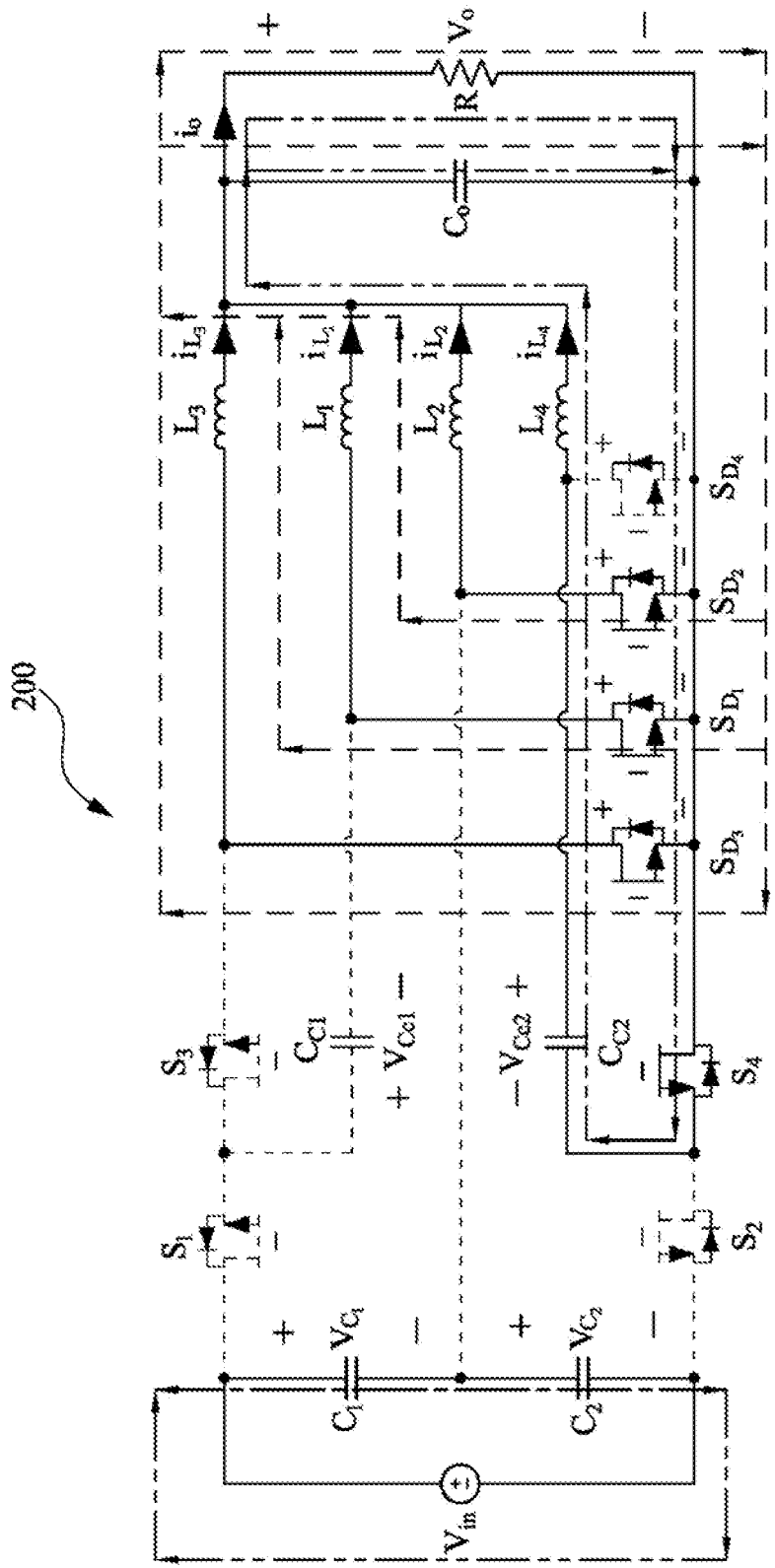
FIG. 6 is the equivalent circuit of the four-phase buck DC converter in the period of $t2 \leq t \leq t3$.

FIG. 6 is the equivalent circuit of the four-phase buck DC converter 200 in the period of t2≤t≤t3.

As shown in FIG. 3 and FIG. 6, the fourth high-side switch S4 is turned on in the mode, the other high-side switches $S_1$, $S_2$ and $S_3$ are turned off (the relating circuit of the turned off high-side switches $S_1$, $S_2$ and $S_3$ in FIG. 6 are represented by dotted lines), the second clamping capacitor $C_{C2}$ discharges to the fourth storage inductor $L_4$, and drives the load through the fourth storage inductor $L_4$.

In the period of t2≤t≤t3, the voltage across the first clamping capacitor $C_{C1}$ is clamped to a fixed voltage, at the same time, the storage inductors $L_1$, $L_2$ and $L_3$ drive the load and transmit the output signal to the load accordingly.

Figure 7:
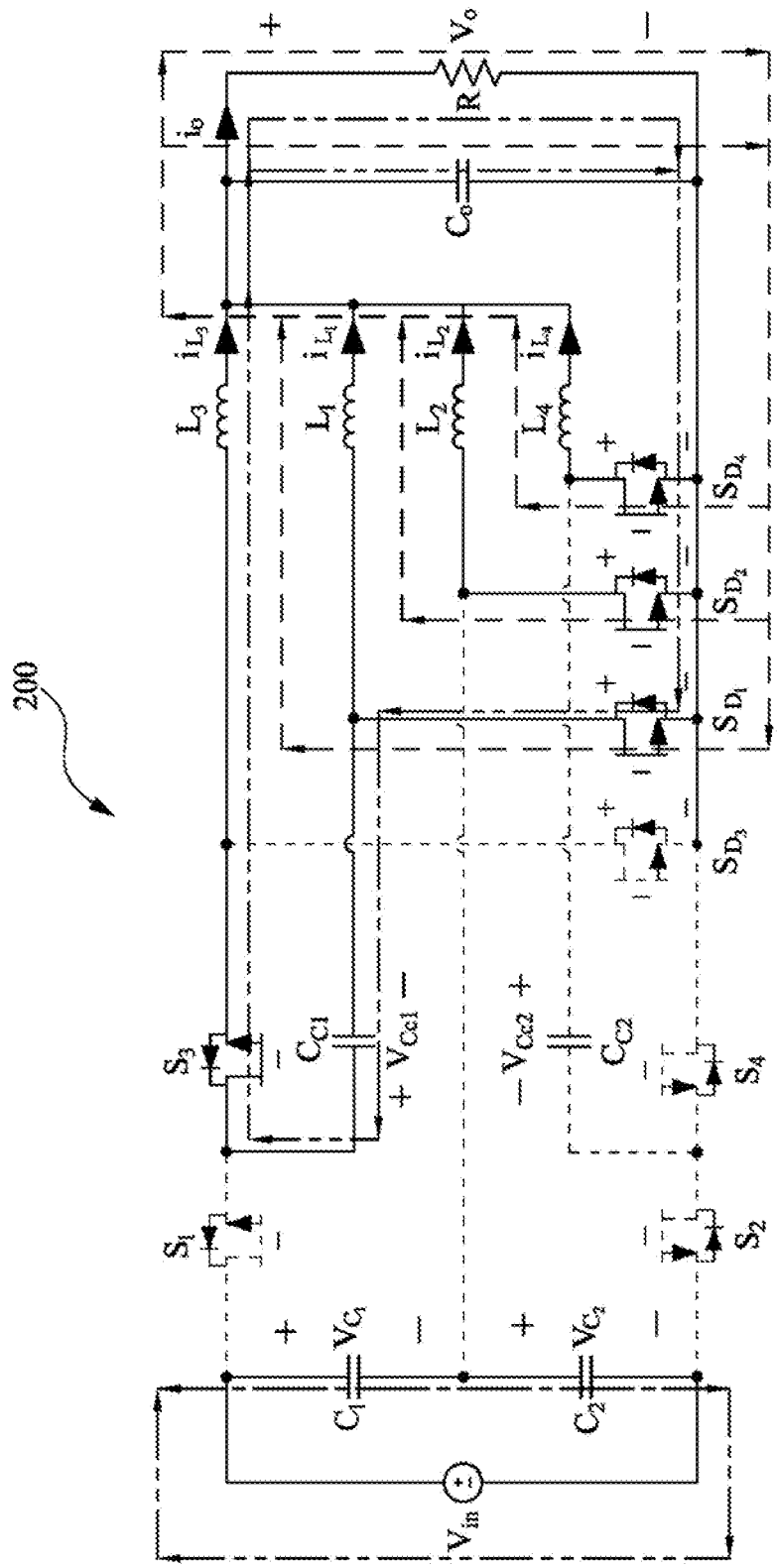
FIG. 7 is the equivalent circuit of the four-phase buck DC converter in the period of $t4 \leq t \leq t5$.

Please refer to FIG. 7, FIG. 7 is the equivalent circuit of the four-phase buck DC converter 200 in the period of $t_4 \le t \le t_5$. In the mode, the third high-side switch $S_3$ is turned on, the other high-side switches $S_1$, $S_2$ and $S_4$ are turned off (the relating circuit of the turned off high-side switches $S_1$, $S_2$ and $S_4$ in FIG. 7 are represented by dotted lines), the first clamping capacitor $C_{C1}$ discharges to the third storage inductor $L_3$ and drives the load through the third storage inductor $L_3$.

In the period of t4≤t≤t5, the voltage across the second clamping capacitor $C_{C2}$ is clamped to a fixed voltage, at the same time, the storage inductors $L_1$, $L_2$ and $L_4$ drive the load and transmit the output signal to the load accordingly.

Figure 8:
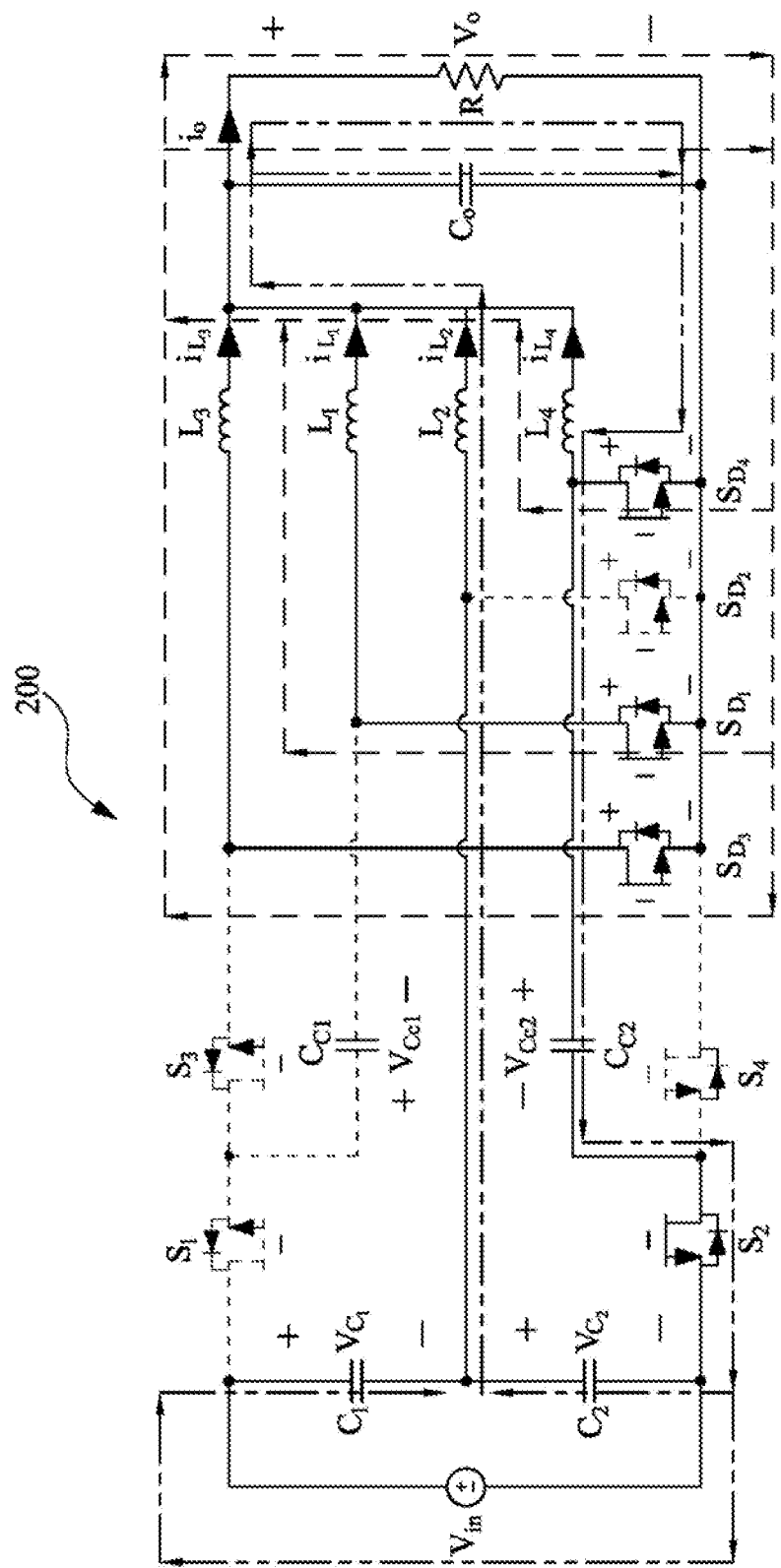
FIG. 8 is the equivalent circuit of the four-phase buck DC converter in the period of $t_6 \leq t \leq t_7$.

Please refer to FIG. 8, FIG. 8 is the equivalent circuit of the four-phase buck DC converter 200 in the period of $t_6 \le t \le t_7$. In the mode, the third high-side switch $S_2$ is turned on, the other high-side switches $S_1$, $S_3$ and $S_4$ are turned off (the relating circuit of the turned off high-side switches $S_1$, $S_3$ and $S_4$ in FIG. 8 are represented by dotted lines), the second input capacitor $C_2$ discharges to the second storage inductor $L_2$ and the second clamping capacitor $C_{C2}$, and it drives the load through the second storage inductor $L_2$.

In the period of $t_6 \le t \le t_7$, the voltage across the first clamping capacitor $C_{C1}$ is clamped to a fixed voltage, at the same time, the storage inductors $L_1$, $L_3$ and $L_4$ drive the load and transmit the output signal to the load accordingly.

As shown in the above embodiments, in the periods of $t_0 \le t \le t_1$, $t_2 \le t \le t_3$, $t_4 \le t \le t_5$ and $t_6 \le t \le t_7$ (shown in FIG. 4, FIG. 6, FIG. 7 and FIG. 8), one of the high-side switches $S_1$, $S_2$, $S_3$ and $S_4$ are turned on one by one, one input capacitor charge one clamping capacitor, at the same time, the input capacitor discharges to the corresponding storage inductor and the load (as shown in FIG. 4 and FIG. 8), or one clamping capacitor that has been charged discharges to the corresponding storage inductor and the load (shown in FIG. 6 and FIG. 7).

In other words, the four-phase buck DC converter 200 includes four capacitors (the first input capacitor $C_1$, the second input capacitor $C_2$, the first clamping capacitor $C_{C1}$ and the second clamping capacitor $C_{C2}$) which are responsible for the power supply of four phases ($t_0 \le t \le t_1$, $t_2 \le t \le t_3$, $t_4 \le t \le t_5$ and $t_6 \le t \le t_7$), respectively. The discharge time of each capacitor is a quarter of the duty cycle (D).

The duty cycle (D) of the four-phase buck DC converter 200 is the proportion a full cycle deducting of $t_1 \sim t_2$, $t_3 \sim t_4$, $t_5 \sim t_6$ and $t_7 \sim t_8$ in the period of $t_0 \sim t_8$, which can be expressed as:

$$D = \frac{(t_1 - t_0) + (t_3 - t_2) + (t_5 - t_4) + (t_7 - t_6)}{t_8 - t_0}$$

Wherein the duty cycle (D) is between 0 and 1.

In the embodiment, the ratio of the output voltage ($V_O$) and the input voltage ($V_{in}$) of the four-phase buck DC converter 200 (that is, the step-down ratio of the four-phase buck DC converter 200) can be approximately expressed as:

$V_O/V_{in} = D/4$

That is, except that the step-down ratio can be adjusted via the duty cycle (D), a more significant step-down effect can be got through the four phases design of the four-phase buck DC converter 200. The output voltage of the four-phase buck DC converter 200 can be adjusted to a quarter of the original input voltage.

Thus, it does not need to overly dependent on reducing the duty cycle to achieve the step-down effect. That is, the four-phase buck DC converter 200 can be operated at a long duty cycle (D). Thus, it does not need to significantly reduce the duty cycle to achieve a sufficient step-down ratio, which can avoid unexpected actions of the switching components due to the too low duty cycle.

In the four-phase buck DC converter 200, both the voltage $V_{C1}$ of the input capacitor $C_1$ and the voltage $V_{C2}$ of the input capacitor $C_2$ are half of the input voltage Vin. Both the maximum clamping voltage of the voltage $V_{CC1}$ of the first clamping capacitor $C_{C1}$ and the voltage $V_{CC2}$ of the second clamping capacitor $C_{C2}$ are a quarter of the input voltage Vin.

In other words, the input capacitor $C_1$, the input capacitor $C_2$, the first clamping capacitor $C_{C1}$ and the second clamping capacitor $C_{C2}$ which are scattered only need to withstand a low voltage. The maximum cross voltage of the first clamping capacitor $C_{C1}$ and the second clamping capacitor $C_{C2}$ in the embodiment is a quarter of the input voltage Vin.

At the same time, the maximum cross voltage of each high-side switch $S_1$, $S_2$, $S_3$ and $S_4$ are lowered to half of the input voltage Vin by adding the first clamping capacitor $C_{C1}$ and the second clamping capacitor $C_{C2}$, and the voltage of each low-side switch $S_{D1}$, $S_{D2}$, $S_{D3}$ and $S_{D4}$ can be lowered to a quarter of the input voltage Vin.

On the other hand, the average current of the inductive current $i_{L1}$, $i_{L2}$, $i_{L3}$ and $i_{L4}$ of the storage inductors $L_1$, $L_2$, $L_3$ and $L_4$ is a quarter of output current Io. As a result, the storage inductors $L_1$, $L_2$, $L_3$ and $L_4$ can be chosen from inductor components with lower inductance value compared to the conventional circuit structure, and the ripple effect of the output current Io can be reduced by an interleave switch of the four phases. In addition, the four-phase buck DC converter 200 can automatically reach current-sharing in the four phases.

On the other hand, the detail operating principle of the three-phase buck DC converter 100 in the FIG. 1 can refer to that of the four-phase buck DC converter 200 in FIG. 4 to FIG. 8, which is omitted herein.

In the three-phase buck DC converter 100 in FIG. 1, the maximum cross voltage of the high-side switches $S_1$, $S_2$ and $S_3$ can be lowered to two-thirds of the input voltage Vin. The maximum cross voltage of each low-side switch $S_{D1}$, $S_{D2}$ and $S_{D3}$ can be lowered to one-third of the input voltage Vin. The voltage $V_{C1}$ of the first input capacitor $C_1$ and the voltage $V_{C2}$ of the second input capacitor $C_2$ are two-thirds and one-third of the input voltage Vin, respectively. The voltage $V_{CC1}$ of the first clamping capacitor $C_{C1}$ is one-third of the input voltage Vin. The average current of the current $i_{L1}$, $i_{L2}$ and $i_{L3}$ on the storage inductors $L_1$, $L_2$ and $L_3$ are all one-third of the average output current $I_o$.

That is, the three-phase buck DC converter 100 in FIG. 1 can achieve the similar effect by setting the first input capacitor $C_1$, the second input capacitor $C_2$, the first clamping capacitor $C_{C1}$ and the output capacitor $C_O$.

In addition, the setting and operation of the three-phase buck DC converter 100 and the four-phase buck DC converter 200 are provided in the above embodiments, which is not limited herein, and the setting and the operating principle of the buck DC converter with different phases can be analogized according to the similar setting.

Figure 9:
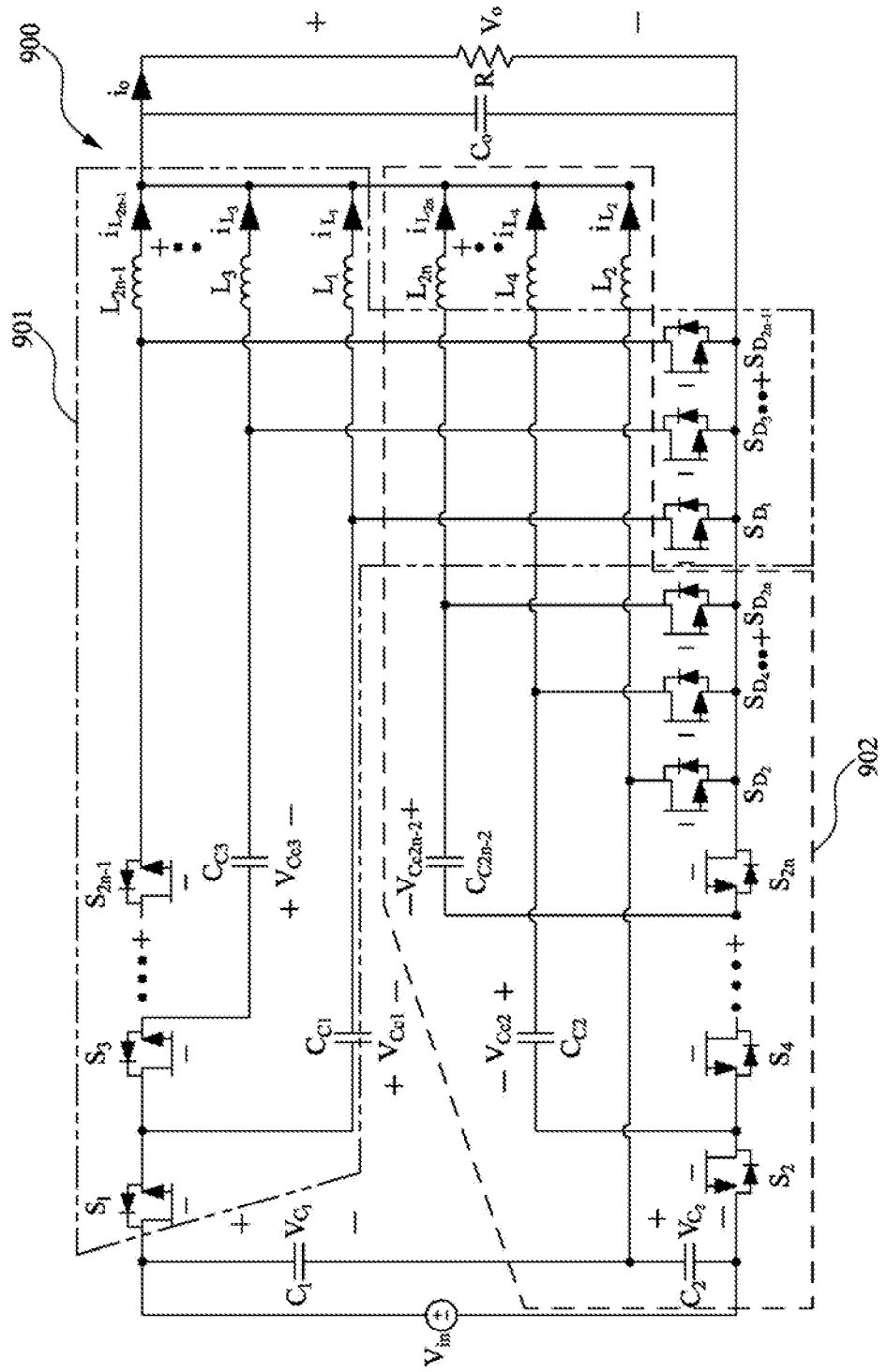
FIG. 9 is a schematic diagram showing a N-phase buck DC converter.

According to the three-phase buck DC converter and the four-phase buck DC converter, an N-phase buck DC converter is provided in the following paragraphs, and N can be any positive integer greater than 3. Please refer to FIG. 9. FIG. 9 is a schematic diagram showing an N-phase buck DC converter. In FIG. 9, the N-phase buck DC converter includes two input capacitors (the first input capacitor $C_1$ and the second input capacitor $C_2$), N−2 clamping capacitors (only four clamping capacitors $C_{C1}$, $C_{C2}$, $C_{C3}$, and $C_{C2n-2}$ of the N−2 clamping capacitors are shown), N high-side switches $S_1$ ... $S_{2n}$, N low-side switches $S_{D1}$, ..., $S_{D2n}$, N storage inductors $L_1$, ..., $L_{2n}$ and an output capacitor $C_O$. N is any positive integer that makes N=2n (N is an even number) or N=2n+1 (N is an odd number), which is defined by whether N is even number or odd number, In order to be convenient for explanation in FIG. 9, N is an even number and 2n=N, persons having the ordinary skill in the art can infer the connection manner when N is an odd number (N=2n+1) according to FIG. 9.

In FIG. 9, the position of the four clamping capacitors $C_{C1}$, $C_{C2}$, $C_{C3}$ and $C_{C2n-2}$ is shown, and the others clamping capacitors are omitted. The N-phase buck DC converter 900 includes N−2 clamping capacitors. The number of the clamping capacitor is depend on the total number of the phases, the three-phase buck DC converter includes one clamping capacitor, the four-phase buck DC converter includes two clamping capacitors, and so on.

In the architecture, the first input capacitor $C_1$ and the second input capacitor $C_2$ are connected in series.

As shown in FIG. 9, the N storage inductors $L_1$ to $L_{2n}$ are connected to the loads. The N storage inductors are divided into a first part (as shown in the odd part circuit in the outline 901 in FIG. 9) and a second part (as shown in the odd part circuit in the outline 902 in FIG. 9), the first part storage inductor includes the first storage inductor $L_1$ to the $(2n-1)^{th}$ storage inductor $L_{2n-1}$ with an odd number of intervals, the second part storage inductor includes the second storage inductor $L_2$ to the $2n^{th}$ storage inductors La with an even number of intervals.

One end of the N low-side switches $S_{D1}$ to $S_{D2n}$ is connected to the N storage inductors $L_1$ to $L_{2n}$, respectively.

The contact of the first input capacitor $C_1$ and the second input capacitor $C_2$ is connected to the second storage inductors $L_2$ of the N storage inductors.

The N high-side switches $S_1$ to $S_{2n}$ are divided into a first part (as shown in the outline 901 in FIG. 9) and a second part (as shown in the outline 902 in FIG. 9). The first part high-side switch includes the first high-side switch $S_1$, the third high-side switch $S_3$ ... and the $(2n-1)^{th}$ high-side switch $S_{2n-1}$ with an odd number of intervals. The high-side switches $S_1$ to $S_{2n-1}$ of the first part are connected in series sequentially. One end of the first high-side switch (the first high-side switches $S_1$) in the first part is connected to the first input capacitor $C_1$, the last high-side switch (the $(2n-1)^{th}$ high-side switch $S_{2n-1}$) in the first part is connected to the $(2n-1)^{th}$ storage inductor $L_{2n-1}$.

The second part high-side switches includes the second high-side switch $S_2$, the fourth high-side switch $S_4$ ... and the $2n^{th}$ high-side switch with an even number of intervals. The high-side switches $S_2 \sim S_{2n}$ of the second part are connected in series sequentially. One end the first high-side switch (the second high-side switch $S_2$) in the second part is connected to the second input capacitor $C_2$.

The N−2 clamping capacitors are divided in to a first part (as shown in the outline 901 in FIG. 9) and a second part (as shown in the outline 902 in FIG. 9). The second part clamping capacitor can be distinguished when N>3. If N=3, the buck DC converter only includes one clamping capacitor (the three-phase buck DC converter 100 in FIG. 1 includes one clamping capacitor $C_{C1}$), and thus there is no second part clamping capacitor. In the embodiment of FIG. 9, N>3.

The first part of the N−2 clamping capacitors includes the first clamping capacitor $C_{C1}$, the third clamping capacitor $C_{C3}$, ..., and the $(2n-3)^{th}$ clamping capacitor (not shown) with an odd number of intervals. One side of the $k^{th}$ clamping capacitor is connected between the $k^{th}$ high-side switch and the $(k+2)^{th}$ high-side switch. The other side of the $k^{th}$ clamping capacitor is connected to the $k^{th}$ storage inductor of the N storage inductors, wherein k is an odd number between 1 and $(2n-3)$. For example, one end of the first clamping capacitor $C_{C1}$ is connected between the first high-side switch St and the third high-side switch $S_3$, and the other end of the first clamping capacitor $C_{C1}$ is connected to the first storage inductor $L_1$; one end of the third clamping capacitor $C_{C3}$ is connected between the third high-side switch $S_3$ and the fifth high-side switch $S_5$, and the other end of the third clamping capacitor $C_{C3}$ is connected to the third storage inductor $L_3$.

The second part of the N−2 first clamping capacitors includes the second clamping capacitor $C_{C2}$, the fourth clamping capacitor (not shown in the figure) . . . to the $(2n-2)^{th}$ clamping capacitor $C_{C2n-2}$ with even number of intervals. One side of the jth clamping capacitor is connected between the jth high-side switch and the $(j+2)^{th}$ high-side switch, the other side of the jth clamping capacitor is connected to the $(j+2)^{th}$ storage inductor of the N storage inductors, and j is an even number between 2 and (2n−2). For example, one end of the second clamping capacitor $C_{C2}$ is connected to the second high-side switch $S_2$ and the fourth high-side switch $S_4$, and the other end of the second clamping capacitor $C_{C2}$ is connected to the fourth storage inductor $L_4$; one end of the $(2n-2)^{th}$ clamping capacitor $C_{C2n-2}$ is connected between the $(2n-2)^{th}$ high-side switch (not shown in FIG. 9) and the $2n^{th}$ high-side switches $S_{2n}$, the other end of the $(2n-2)^{th}$ clamping capacitor $C_{C2n-2}$ is connected to the $2n^{th}$ storage inductor $L_{2n}$.

One end of the output capacitor $C_O$ is connected to the low-side switches Sot to $S_{D2n}$, and the other end is connected to the storage inductors $L_1$ to $L_{2n}$. In addition, the resistor R is connected to the output capacitor $C_O$ in parallel.

FIG. 9 shows the general form of the N-phase buck DC converter 900. The four-phase buck DC converter 200 shown in the FIG. 2 is an example of N=4(n=2). The three-phase buck DC converter 100 shown in the FIG. 1 is an example of N=3. The various implementations when N is a different number can be inferred with referring to the FIG. 1, FIG. 2 and FIG. 9.

In the N-phase buck DC converter 900 in the FIG. 9, the relationship between the on/off of the high/low-side switches and the charge/discharge of the capacitors can refer to the related illustration of the four-phase buck DC converter 200 in the previous embodiment (FIG. 2 to FIG. 8). When the $T^{th}$ high-side switches is turned on, the other N−1 high-side switches are turned off, the corresponding $T^{th}$ low-side switch is turned off and the other N−1 low-side switches are turned on. On the other hand, when the $T^{th}$ high-side switch is turned on, one input capacitor charges one clamping capacitor via the $T^{th}$ high-side switch and drives the load via one storage inductor, or one clamping capacitor discharges and drives the load via one storage inductor. T is a positive integer between 1 and N. The detailed charging/discharging method is omitted herein.

Figure 10:
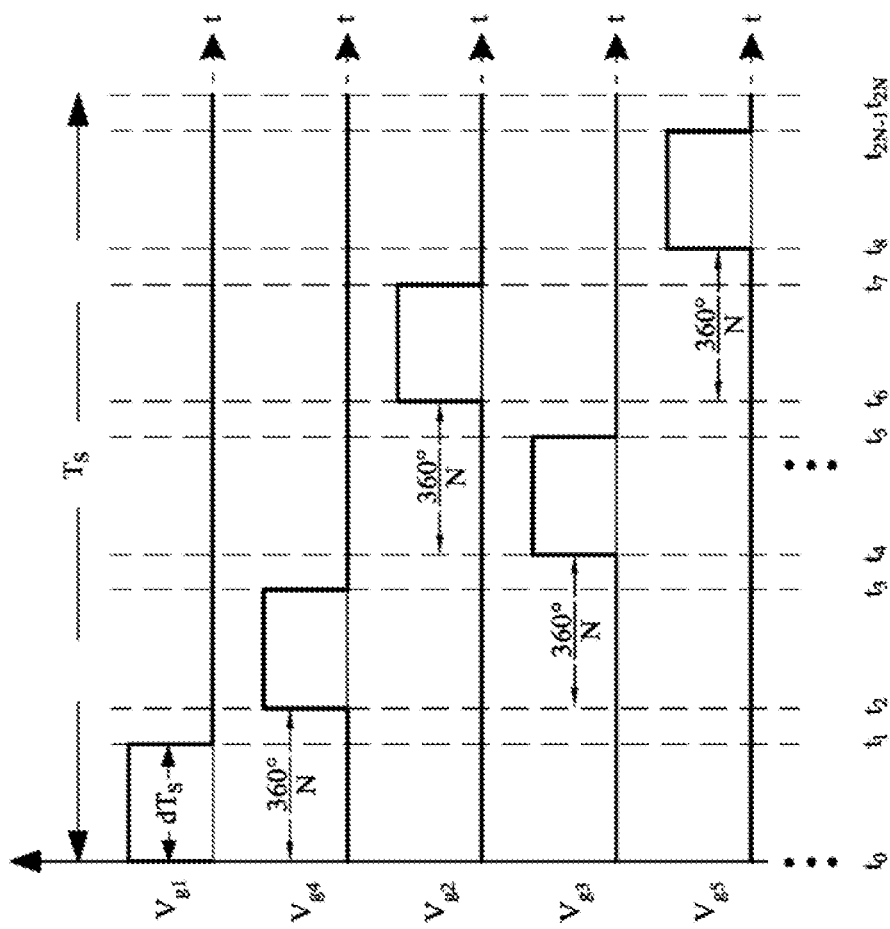
FIG. 10 is a sequence diagram showing switch signals at the high-side of the N-phase buck DC converter.
Figure 11:
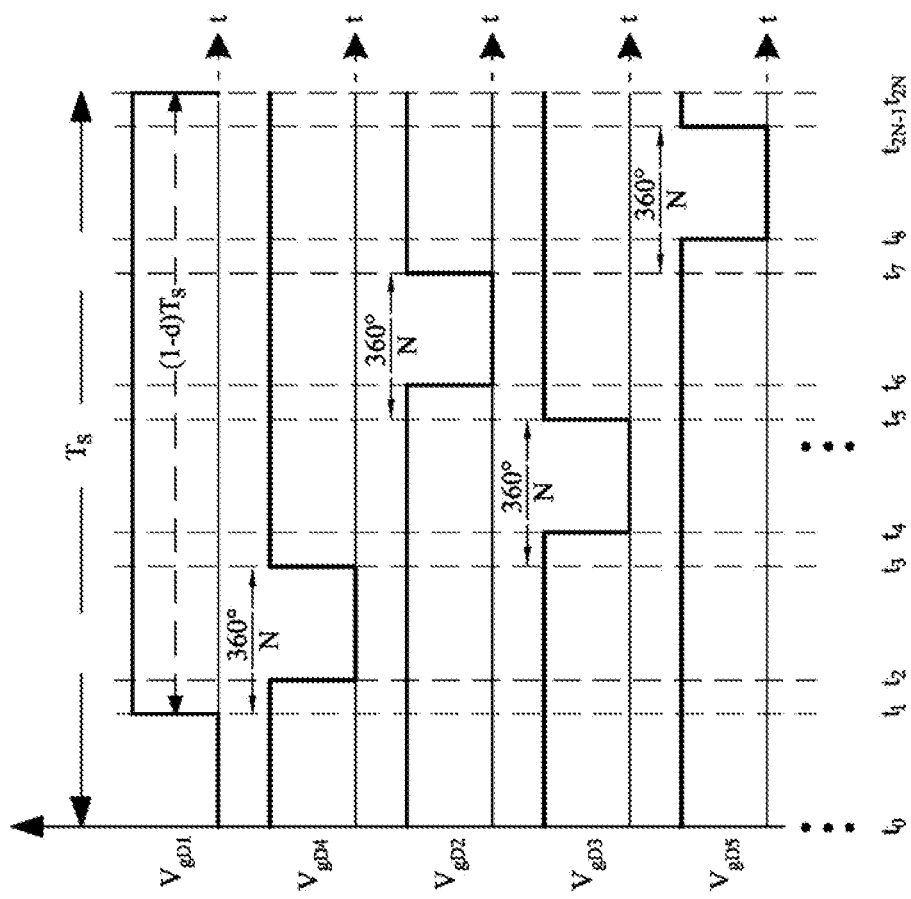
FIG. 11 is a sequence diagram showing switch signals at the low-side of the N-phase buck DC converter.

FIG. 10 is a sequence diagram showing switch signals at the high-side of the N-phase buck DC converter 900 in the FIG. 9. FIG. 11 is a sequence diagram showing switch signals at the low-side of the N-phase buck DC converter 900 in the FIG. 9.

The switching signal of the interlacing N-phase buck DC converter is shown in FIG. 10, and $V_{g1}$, $V_{g2}$, $V_{g3}$ to Vgn respectively represents the gate voltage signals of the high-side switches $S_1$ to $S_n$, the phases of switches are interlaced, as shown in FIG. 10. The interval between the gate voltage signal $V_{g1}$ and $V_{g2}$ of the high-side switches $S_1$ and $S_2$ is 360/N degrees (120 degrees in the three-phase buck DC converter, 90 degrees in the four-phase buck DC converter, 72 degrees in the five-phase buck DC converter, and so on). The interval between the gate voltage signal $V_{g2}$ and $V_{g4}$ of the high-side switches $S_2$ and $S_4$ is 360/N degrees, The interval between the high-side switches $S_4$ and $S_3$, the high-side switches $S_3$ and $S_5$ are all 360/N degrees, and so on. Consequentially, as shown in FIG. 10, the phases of the gate voltage signals of each switch are interlaced to reduce the ripple effect.

In addition, as shown in FIG. 11, $V_{gD1}$, $V_{gD2}$, $V_{gD3}$ and $V_{gDn}$ respectively represents the gate voltage signals of the low-side switches $S_{D1}$ to $S_{Dn}$, please refer to FIG. 10 and FIG. 11, the high-side switches and the low-side switches are switched in complementary (the gate voltage signal $V_{g1}$, $V_{g2}$, $V_{g3}$ to $V_{gn}$ of the high-side and the gate voltage signal $V_{gD1}$, $V_{gD2}$, $V_{gD3}$ to $V_{gDn}$ of the low-side are complementary). In FIG. 11, the phases of the gate voltage signals $V_{gD1}$, $V_{gD2}$, $V_{gD3}$ to $V_{gDn}$ are interlaced to reduce the ripple effect.

In addition, the N-phase buck DC converter 900 can achieve above-mentioned effect by setting two input capacitors, N−2 clamping capacitors and one output capacitor $C_O$.

The signal simulation results of the multi-phase buck DC converter (the four-phase buck DC converter 200 is taken as an example, which is not limited) are provide in the following paragraphs to state the operating characteristics of the buck DC converter. Please refer to FIG. 12 to FIG. 16, and FIG. 12 to FIG. 16 are schematic diagrams showing waveforms of the signal simulation results of the four-phase buck DC converter 200 in the FIG. 2

In the signal simulations shown in FIG. 12 to FIG. 6, test specifications are shown as follows: the input voltage $V_{in}$ is 19V, the output voltage $V_o$ is 1V, the output current $I_o$ is 100 A, the switching frequency is 350 kHz, the inductance of the storage inductors $L_1$, $L_2$, $L_3$ and $L_4$ is 056 μH, the capacitance of the clamping capacitor $C_{C1}$ and $C_{C2}$ is 150 Mf/6.3V, the capacitance of the input capacitors $C_1$ and $C_2$ is 100 μF/10V, the capacitance of the output capacitor $C_O$ is 560 μF/2.5V, the high-side switches $S_1$ to $S_4$ and the low-side switches $S_{D1}$ to $S_{D4}$ are N type metal oxide semiconductors, the Vds is 30V.

Figure 12:
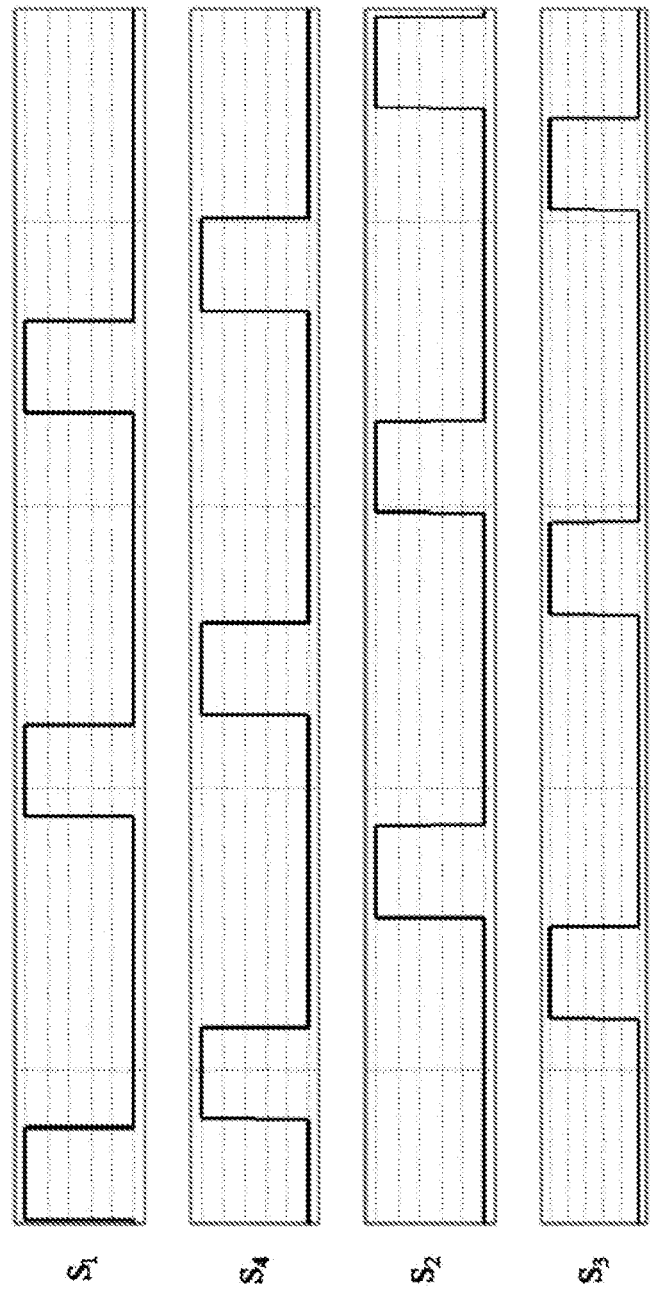
FIG. 12 to FIG. 16 are schematic diagrams showing waveforms of the signal simulation results of the four-phase buck DC converter in FIG. 2.

FIG. 12 shows the gate signal waveform of the high-side switches in the four-phase buck DC converter 200. Under the same condition that step-down ratio is nineteen, the duty cycle of the four-phase buck DC converter 200 is about 4/19=0.22 (the duty cycle of the conventional converter is about 1/19=0.055), and thus the four-phase buck DC converter 200 can operate at a longer duty cycle, in other words, the turn-on time of the low-side switches is shortened to reduce the transmission loss of the low-side switches.

Figure 13:
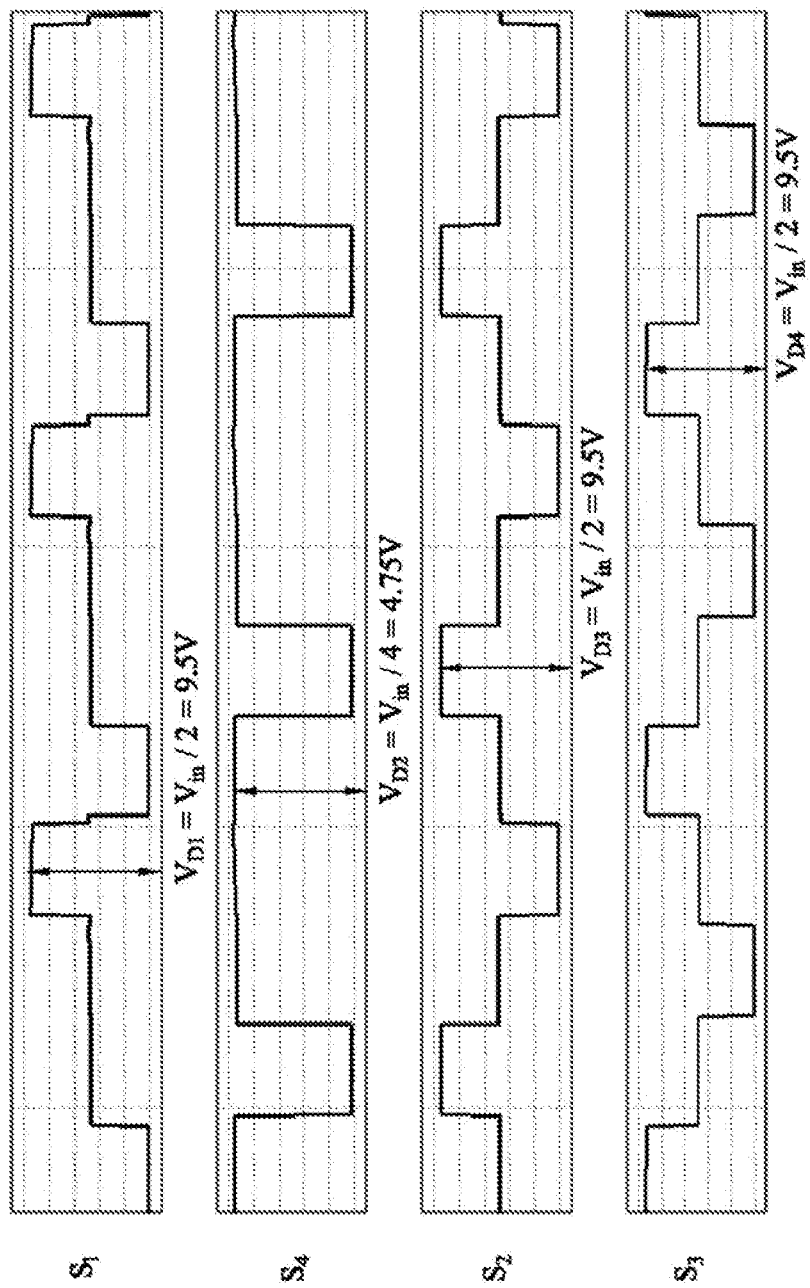

FIG. 13 is a schematic diagram showing the cross voltage waveform of the high-side switches in the four-phase buck DC converter 200. Please refer to the switching mode shown in the FIG. 3 to FIG. 8, the maximum cross voltage $V_{D1}$ of the high-side switch $S_1$ in the converter is 9.5V, the maximum cross voltage $V_{D2}$ of the high-side switch $S_2$ is 4.75V, the maximum cross voltage $V_{D3}$ of the high-side switch $S_3$ is 9.5V, the maximum cross voltage $V_{D4}$ of the high-side switch $S_4$ is 9.5V (the maximum cross voltage of the high-side switch in a conventional converter is about 19V). Thus, compared to the conventional converter, the voltage of the high-side switches $S_1$, $S_3$ and $S_4$ can be lowered to half of the input voltage, the voltage of the high-side switches $S_2$ can be lowered to a quarter of the input voltage, Thus, switch components with low voltage-resistor and low stray capacitance can be used to reduce the switching loss.

Figure 14:
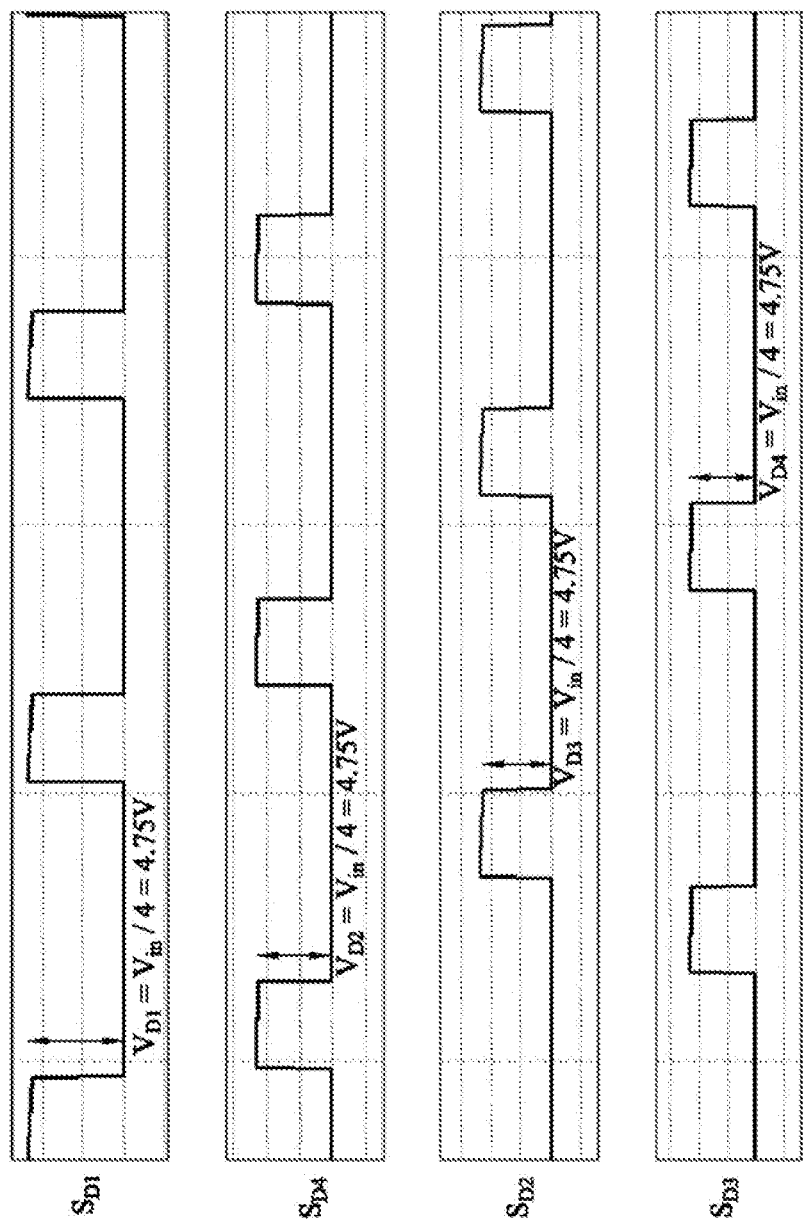

FIG. 14 is a schematic diagram showing the cross voltage waveform of the low-side switches in the four-phase buck DC converter 200. Please refer to the switching mode shown in the FIG. 3 to FIG. 8, the maximum cross voltage of the low-side switches $S_{D1}$, $S_{D2}$, $S_{D3}$ and $S_{D4}$ in the converter are about 4.75V. In contrast, the maximum cross voltage of the low-side switches in the conventional converter is about 19V. Thus, compared to the conventional converter, the voltage of the low-side switches $S_{D1}$ to $S_{D4}$ can be lowered to a quarter of the input voltage, Thus, switch components with low value of permissible voltage and low conducting resistance can be used to reduce the transmission loss caused by the high current.

Figure 15:
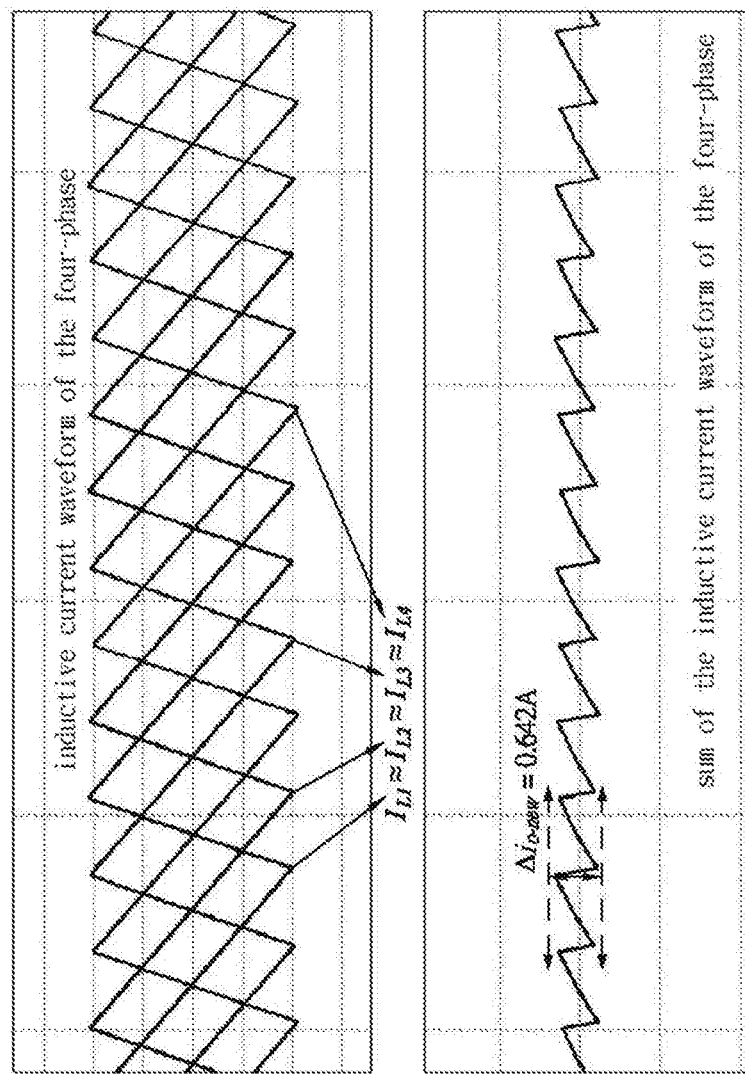

FIG. 15 is a schematic diagram showing the inductive current waveform of the four-phase buck DC converter 200 and the sum of the inductive current waveform of the four-phase buck DC converter 200.

Without the control of current sharing, average values of the inductive current $I_{L1}$, $I_{L2}$, $L_{L3}$ and $I_{L4}$ in the four-phase buck DC converter 200 are almost the same. Please refer to the sum of the inductive current waveform of the four-phase buck DC converter 200, the ripple current $\Delta i_{o\text{-}new}$ of the converter is about 0.642 A (In contrast, the ripple current of the conventional converter is about 4.528 A). Thus, the converter can achieve a lower output ripple current.

Figure 16:
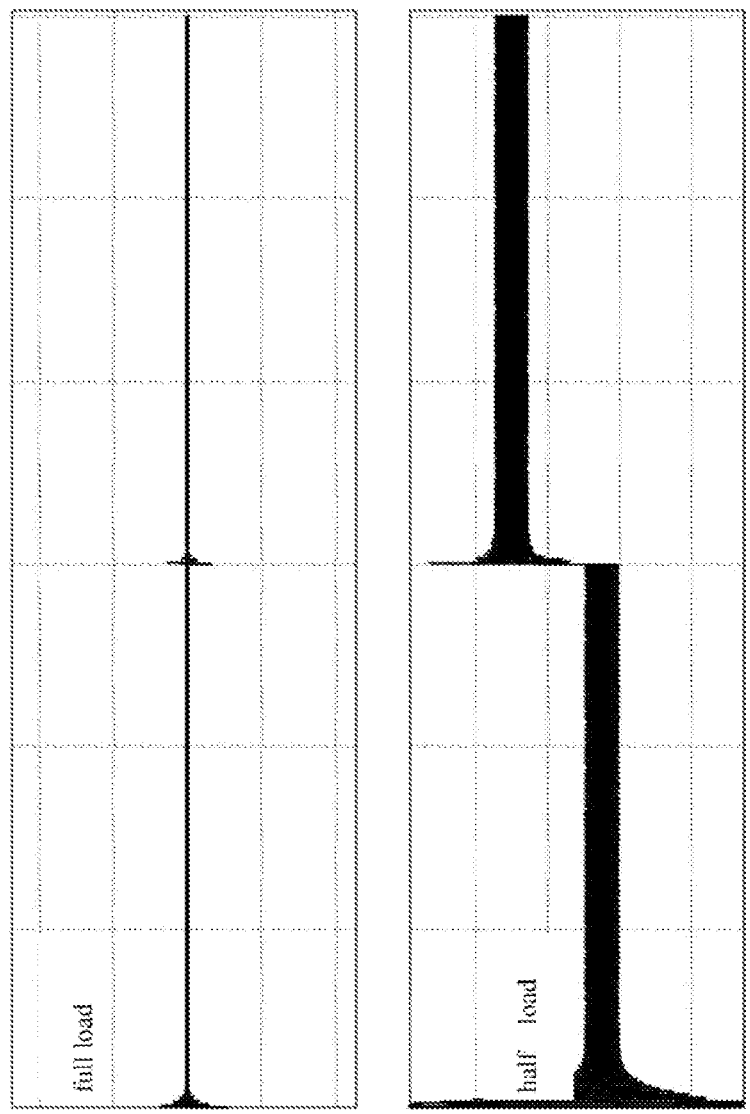

FIG. 16 is a schematic diagram showing the output voltage and inductance current waveform of the four-phase buck DC converter 200 when the load current of the four-phase buck DC converter 200 increases from 50 A to 100 A. Whether the four-phase buck DC converter 200 is half load or full load, it can make inductors have current sharing.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An N-phase buck DC converter for driving a load, where N=2n and N is an even number equal to or greater than 4 and n is a positive integer, the N-phase buck DC converter comprising:

N storage inductors connected to the load, wherein the N storage inductors are divided into a first part of storage inductors and a second part of storage inductors, the first part of storage inductors include a first storage inductor to a $(2n-1)^{th}$ storage inductor with a fixed interval, the second part of storage inductors include a second storage inductor to a $2n^{th}$ storage inductor with the fixed interval;

N low-side switches, wherein one side of each low-side switch is connected to a corresponding one of each of the N storage inductors, respectively;

a first input capacitor;

a second input capacitor connected to the first input capacitor in series, wherein a contact of the first input capacitor and the second input capacitor is connected to the second storage inductor of the N storage inductors;

N high-side switches divided into a first part of high-side switches and a second part of high-side switches, wherein the first part of high-side switches include a first high-side switch to a $(2n-1)^{th}$ high-side switch with the fixed interval, the second part of high-side switches include a second high-side switch to a $2n^{th}$ high-side switch with the fixed interval, the $(2n-1)^{th}$ high-side switch of the first part of high-side switches is connected to the $(2n-1)^{th}$ storage inductor of the N storage inductors; and N-2 clamping capacitors divided into a first part of clamping capacitors and a second part of clamping capacitors, wherein the first part of clamping capacitors include a first clamping capacitor to a $(2n-3)^{th}$ clamping capacitor with the fixed interval, and one side of a $k^{th}$ clamping capacitor is connected to a $k^{th}$ high-side switch and a $(k+2)^{th}$ high-side switch, an other side of the $k^{th}$ clamping capacitor is connected to a $k^{th}$ storage inductor of the N storage inductors, wherein k is an odd number between 1 and (2n-3), the second part of clamping capacitors includes a second clamping capacitor to a $(2n-2)^{th}$ clamping capacitor with the fixed interval, and one side of a $j^{th}$ clamping capacitor is connected to a $j^{th}$ high-side switch and a $(j+2)^{th}$ high-side switch, an other side of the $j^{th}$ clamping capacitor is connected to a $(j+2)^{th}$ storage inductor of the N storage inductors, wherein j is an even number between 2 and (2n-2).

2. The N-phase buck DC converter according to claim 1, wherein in the first part of high-side switches, one side of the first high-side switch is connected to the first input capacitor, and the first high-side switch to the $(2n-1)^{th}$ high-side switch are connected in series sequentially.

3. The N-phase buck DC converter according to claim 1, wherein in the second part of high-side switches, one side of the second high-side switch is connected to the second input capacitor, and the second high-side switch to the $2n^{th}$ high-side switch are connected in series sequentially.

4. The N-phase buck DC converter according to claim 1, wherein when a $T^{th}$ high-side switch is turned on, the other (N-1) high-side switches are turned off, a corresponding $T^{th}$ low-side switch is turned off, and the other (N-1) low-side switches are turned on, wherein T is a positive integer between 1 and N.

5. The N-phase buck DC converter according to claim 1, wherein when a $T^{th}$ high-side switch is turned on, one input capacitor charges one of the clamping capacitors and drives the load via the $T^{th}$ high-side switch, or one of the clamping capacitors discharges to drive the load.

6. The N-phase buck DC converter according to claim 1, wherein when the N high-side switches are all turned off, the load is driven by temporary power of the N storage inductors.

7. An N-phase buck DC converter for driving a load, wherein N=2n+1 and N is an odd number equal to or greater than 3 and n is a positive integer, the N-phase buck DC converter comprising:

N storage inductors connected to the load, wherein the N storage inductors are divided into a first part of storage inductors and a second part of storage inductors, the first part of storage inductors include a first storage inductor to a $(2n+1)^{th}$ storage inductor with an odd numbered interval, the second part of storage inductors include a second storage inductor to a $2n^{th}$ storage inductor with an even numbered interval;

N low-side switches, wherein one side of each low-side switch is connected to a corresponding one of each of the N storage inductors, respectively;

a first input capacitor;

a second input capacitor connected to the first input capacitor in series, wherein a contact of the first input capacitor and the second input capacitor is connected to the second storage inductor of the N storage inductors;

N high-side switches, divided into a first part of high-side switches and a second part of high-side switches, wherein the first part of high-side switches include a first high-side switch to a $(2n+1)^{th}$ high-side switch with the odd numbered interval, the second part of high-side switches include a second high-side switch to a $2n^{th}$ high-side switch with the even numbered interval, the $(2n+1)^{th}$ high-side switch of the first part of high-side switches is connected to the $(2n+1)^{th}$ storage inductor of the N storage inductors; and N-2 clamping capacitors, divided in to a first part of clamping capacitors and a second part of clamping capacitors, wherein the first part of clamping capacitors include a first clamping capacitor to a $(2n-1)^{th}$ clamping capacitor with the odd numbered interval, and one side of a $k^{th}$ clamping capacitor is connected to a $k^{th}$ high-side switch and a $(k+2)^{th}$ high-side switch, an other side of the $k^{th}$ clamping capacitor is connected to a $k^{th}$ storage inductor of the N storage inductors, wherein k is an odd number between 1 and (2n−1), and when N>3, the second part of clamping capacitors include a second clamping capacitor to a $(2n-2)^{th}$ clamping capacitor with the even numbered interval, and one side of a $j^{th}$ clamping capacitor is connected to a $j^{th}$ high-side switch and a $(j+2)^{th}$ high-side switch, an other side of the $j^{th}$ clamping capacitor is connected to a $(j+2)^{th}$ storage inductor of the N storage inductors, wherein j is an even number between 2 and (2n−2).

8. The N-phase buck DC converter according to claim 7, wherein in the first part of high-side switches, one side of the first high-side switch is connected to the first input capacitor, and the first high-side switch to the $(2n-1)^{th}$ high-side switches are connected in series sequentially.

9. The N-phase buck DC converter according to claim 7, wherein in the second part of high-side switches, one side of the second high-side switch is connected to the second input capacitor, and the second high-side switches to the $2n^{th}$ high-side switches are connected in series sequentially.

10. The N-phase buck DC converter according to claim 7, wherein when a $T^{th}$ high-side switch is turned on, the other (N−1) high-side switches are turned off, a corresponding $T^{th}$ low-side switch is turned off, and the other (N−1) low-side switches are turned on, wherein T is a positive integer between 1 and N.

11. The N-phase buck DC converter according to claim 7, wherein when a $T^{th}$ high-side switch is turned on, one input capacitor charges one of the clamping capacitors via the $T^{th}$ high-side switch and drives the load, or one of the clamping capacitors discharges to drive the load.

12. The N-phase buck DC converter according to claim 7, wherein when the N high-side switches are all turned off, the load is driven by temporary power of the N storage inductors.

* * * * *